June 23, 1959 — H. TIETZE — 2,891,540
RESPIRATORY FACE MASK
Filed March 5, 1957 — 3 Sheets-Sheet 1

INVENTOR
Hermann Tietze

June 23, 1959 H. TIETZE 2,891,540
RESPIRATORY FACE MASK
Filed March 5, 1957 3 Sheets-Sheet 2

INVENTOR
Hermann Tietze

BY
Bailey, Stephen & Huettig
ATTORNEYS

United States Patent Office 2,891,540
Patented June 23, 1959

2,891,540
RESPIRATORY FACE MASK

Hermann Tietze, Lubeck, Germany, assignor to Otto Heinrich Drager, Lubeck, Germany Application March 5, 1957, Serial No. 644,077

2 Claims. (Cl. 128—141)

This invention is directed to face masks of the respiratory type.

Vapor condensation occurs on the inside of the eye glass lenses of safety masks, such being caused by moisture in the exhaled breath. This fogs the lenses and decreases visibility therethrough. To overcome this, clear glass has been used which is composed of transparent material having a hygroscopic layer of material on the inner eye glass lens surfaces. This layer prevents fogging by absorbing the condensed water drops. However, clear glass is relatively expensive, and its activity is limited to the absorption of the hygroscopic layer, which necessitates frequently changing the eye glass lenses.

Moreover, hygroscopic layers are used efficiently only in masks having relatively round or almost flat eye glass lenses. A further difficulty lies in that clear glass windows are optically inefficient.

In order to prevent fogging of the eye glass lenses, it has also been suggested to apply some kind of a liquid or paste on the inside of the eye glass lens which will reduce the surface tension of the condensed water particles so that the water will not form as single drops on the eye glass lens. This also has the disadvantage of a limited activity and needs frequent renewal.

It is further known to prevent fogging of the eye glass lenses by conducting the intake inhalation air directly to the eye glass lens area. This is objectionable in that the air is channeled to the eye glass lens area at a relatively high speed which is discomforting to the eyeball and can also lead to dangerous eye infections. A further disadvantage occurs in the time of no inhalation air flow alternated with the exhaled air periods, during which time moisture will condense on the eye glass lenses, even if only for a short period.

It has also been known to construct masks composed of an outer mask fitted with an inner mask, with the inner mask separated into two sections. The smaller inner mask is hollowed in order to fit over and protect the mouth and nose and is connected to the exterior by means of an exhaust exhalation valve. Air drawn into the mask through the intake valve has access initially only to the intermediate space between the outer and inner masks and flushes this area and by-passes the inside of the eye glass lenses. Only then does it reach the air in the hollow space on the inner side of the inner mask. Exhaled air passes directly from the inner mask to the exterior, and the moisture in the exhaled air is thus kept from being deposited on the eye glass lenses.

In the above form, the inner and outer masks are each, respectively, tightly fitted on the skin of the face of the wearer of the mask. A check valve is fitted between the outer and inner masks which prevents the back flow of the fresh air intake. This form has several disadvantages in that it is quite complicated in production, as the final masks essentially consist of two separately produced masks which must be connected to each other. This results in the formation of a relatively stiff mask. As the shape of each person's face is different, it is difficult to make such a mask fit tightly. Also, another disadvantage is in that only a small part of the intake air passes the eye glass lenses.

The objects of the present invention are to produce a mask which avoids the disadvantages of the prior known masks, and will keep the eye glass lenses clear of fog in order to produce better visibility.

In general, these objects are obtained by constructing a mask which has an eye glass lens air wash system, and a portion surrounding the nose and mouth communicating therewith. This mask is formed by molding to product inwardly directed concavo-convex ribs for contacting the face and outwardly projecting nose and eye portions. The inwardly projecting ribs are composed of double elastic walls which are flexible enough to conform to the shape of each individual face without pressing too strongly thereon.

In the mask of this invention, the construction is such that the portion covering the nose and mouth does not touch the face above or immediately adjacent each side of the nose. This has the advantage in that substantially no pressure is exerted on the face by the mask. At the same time, a channel is formed for the intake air, and the intake air can be drawn in and forced to flow across the inner surface of the eye glass lenses in front of the eyes, and then passes down along side of the nose to the nostrils and mouth. In a preferred form of the construction, an inwardly projecting concavo-convex rib is formed with the bight of the rib positioned between the lower lip and chin and the legs of the rib upwardly extending immediately adjacent the nose and toward the eye glass lens portions of the mask. This nose covering portion of the mask is increased in depth from the portion of the mask adjacent the bridge of the nose toward the mouth portion.

The means by which the objects of the invention are obtained are described more fully with reference to the accompanying schematic drawings in which.

Figure 1:
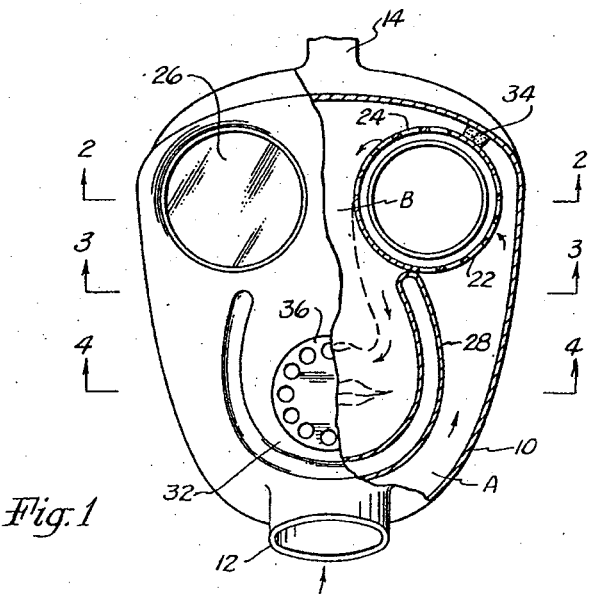
Figure 1 is a front elevational view of the mask partly shown in section.
Figure 2:
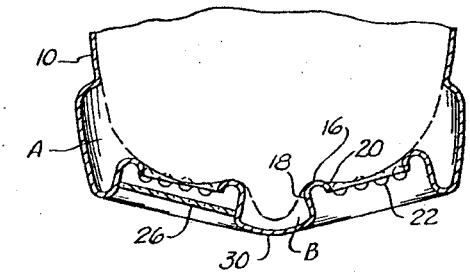
Figure 2 is a cross-sectional view on the line 2—2 of Figure 1.

The mask 10 is composed of flexible moldable material. Intake inhalation tube 12 is adapted to be connected to the intake air filter, and straps 14 secured to the mask are for the purpose of fastening the mask to the head of the wearer.

Eye socket portions are formed during the molding of the mask by forming inwardly directed concavo-convex ribs 16 having one wall or leg 18 connected to the nose portion of the mask, to be later described, and having an inner leg 20 of less length. Holes 22 are formed in the wall or leg 18 on one side of the wall extending obliquely to the vertical, and holes 24 are formed in leg 18 opposite to holes 22. An eye glass lens 26 is mounted on the exterior surface of wall or leg 18 and spaced from the outer edge of inner leg 20 and outwardly of holes 22 and 24.

The nose portion is defined in part by an inwardly extending concavo-convex U-shaped rib 28, the bight of which extends between the lower lip and chin portions of the mask, and the legs of which extend upwardly toward the eye sockets along, but spaced from, the nose.

This nose portion is molded so that it is spaced above the nose, and increasing in height from the nose bridge portion 30 of the mask to the mouth portion 32. Above the eye socket leg 18 are placed plugs 34 in order to seal off the space between the eye sockets and the upper wall of the mask. An exhalation exhaust valve 36 is mounted in the nose portion of the mask lying over the mouth and nostrils.

The operation of this construction is as follows. Air entering intake tube 12 passes through channel A formed between rib 28 and the surface of mask 10, it being noted that the bottom of rib 28 sits upon the face of the wearer in tight conformity therewith and that the top of rib 28 extends to eye socket leg 18 to form an air seal therebetween. The air passes through holes 22 in leg 18 and by reason of inner leg 20 is directed away from the eyeball and onto the inner surface of the eye glass lenses where it evaporates any moisture tending to condense thereon. The intake air then passes out through holes 24 and in the channel B beneath nose bridge portion 30 down along the nose to the nostrils and mouth where it can be inhaled. Exhaust exhaled air flows directly from the nose and mouth through valve 36 into the atmosphere.

Figure 3:
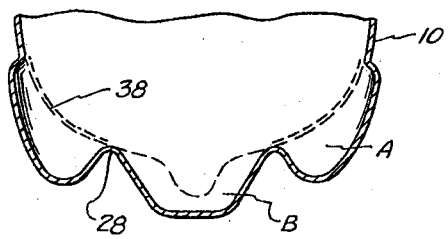
Figure 3 is a cross-sectional view on the line 3—3 of Figure 1.
Figure 4:
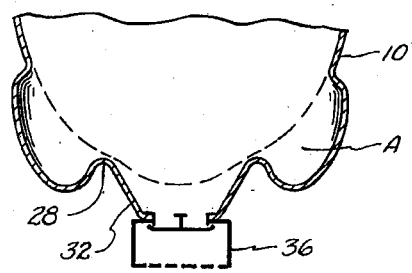
Figure 4 is a cross-sectional view on the line 4—4 of Figure 1.
Figure 5:
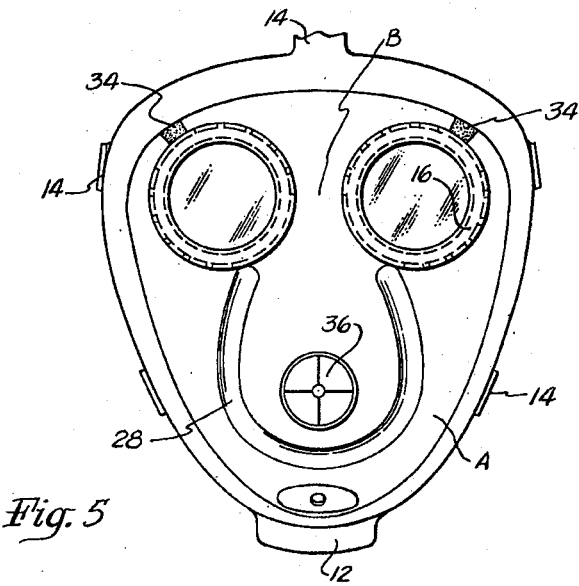
Figure 5 is an elevational view of the inside of the mask.
Figure 6:
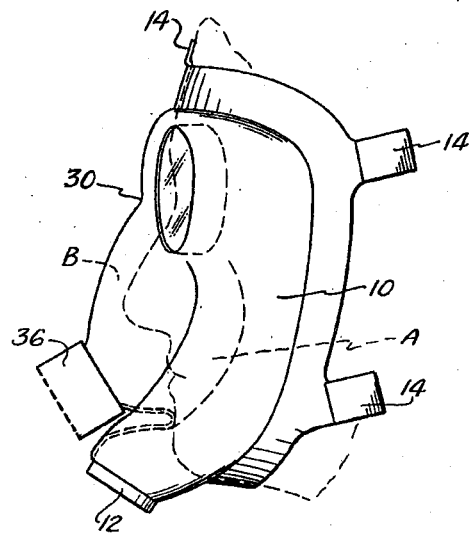
Figure 6 is a side view of the mask of Figure 1.

As indicated in Figure 3, the skin of the face normally exposed to the intake air in the channel A extending from the intake tube to the eye sockets can be protected by means of a protective inner lining 38 secured to the inner surface of the face mask.

In the eye socket portion, groove means can be provided on the outer edge of leg 20 for mounting the eye glass lenses. These lenses can be mounted in any suitable way, but it is prefered to provide an exchangeable mounting.

The face mask of this invention, in addition to preventing the fogging of the eye glass lenses, also has a high degree of flexibility because of the construction of the nose and nose bridge portions of the mask so that the mask can conform to the surface contours of various shaped faces. The use of the concavo-convex ribs enables the mask to maintain a very simple form of construction and eliminates the need for separate inner and outer mask portions.

Having now described the means by which the objects of the invention are obtained, I claim:

1. A respiratory safety face mask comprising a flexible body having eye sockets fitted with lenses, an air inlet opening in the chin portion, a nose portion, and an inwardly turned concavo-convex U-shaped rib outlining said nose portion and having its free ends terminating adjacent to and beneath said eye sockets.

2. A mask as in claim 1, said nose portion having a decreasing height from adjacent the mouth portion to the nose bridge portion of said body.

References Cited in the file of this patent

UNITED STATES PATENTS

| | | |
|---|---|---|
| 2,156,852 | Horak | May 2, 1939 |

FOREIGN PATENTS

| | | |
|---|---|---|
| 312,594 | Great Britain | May 28, 1929 |